UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 229,492, dated June 29, 1880.

Application filed May 8, 1880. (Specimens.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material, (Case D;) and I do hereby declare that the following is a full, clear, and exact description thereof.

The design of my invention is to produce upon the surface of a button any desired figure or figures having a different color from the body of said button; and to this end it consists in the method employed, substantially as and for the purpose specified.

In the manufacture of buttons I take sheets of the prepared material, and, during or after the process of softening the same upon a heated plate, place upon each sheet a plate of metal or other suitable material provided with openings having the desired size, shape, and number, and then sprinkle upon said plate powdered coloring material. The powdered coloring material will pass through openings in the stencil-plate upon the surface of the sheet of plastic material placed below; after which said plate is removed, leaving upon said sheet spots of said coloring material that exactly correspond to the openings in said stencil-plate. The plastic material is now worked up in the usual manner, and the buttons produced will each have spots of color upon their surfaces corresponding to the shape and size of the openings in the stencil-plate.

Having thus fully set forth the nature and merits of my invention, what I claim as new is—

The hereinbefore-described method of ornamenting buttons by coating portions of the surface of sheets of plastic material before passing the same through the button-dies with powdered coloring material applied through a stencil-plate, substantially as and for the purpose specified.

In testimony that I claim the foregoing I have hereunto set my hand this 5th day of May, 1880.

P. L. SYLVESTER.

Witnesses:
P. C. WOODRUFF,
H. WOODRUFF.